United States Patent
Dell'Acqua et al.

(10) Patent No.: US 9,964,242 B2
(45) Date of Patent: May 8, 2018

(54) CONNECTION JOINT FOR PIPES TO CONVEY GAS, COMPRESSED AIR AND OTHER FLUIDS

(71) Applicant: INGERSOLL-RAND COMPANY, Davidson, NC (US)

(72) Inventors: Mauro Dell'Acqua, Carasco (IT); Eros Di Giusto, Fogliano-Redipuglia (IT)

(73) Assignee: INGERSOLL-RAND COMPANY, Davidson, NC (US)

(*) Notice: Subject to any disclaimer, the term of this patent is extended or adjusted under 35 U.S.C. 154(b) by 284 days.

(21) Appl. No.: 14/729,888

(22) Filed: Jun. 3, 2015

(65) Prior Publication Data
US 2015/0377392 A1 Dec. 31, 2015

(30) Foreign Application Priority Data
Jun. 3, 2014 (IT) .............................. GE2014A0051

(51) Int. Cl.
*F16L 19/04* (2006.01)
*F16L 19/08* (2006.01)
(Continued)

(52) U.S. Cl.
CPC ............. *F16L 19/046* (2013.01); *F16L 19/08* (2013.01); *F16L 23/02* (2013.01); *F16L 23/024* (2013.01);
(Continued)

(58) Field of Classification Search
CPC ......... F16L 19/046; F16L 19/08; F16L 23/02; F16L 23/024; F16L 23/162; F16L 23/22; F16L 2201/20
See application file for complete search history.

(56) References Cited

U.S. PATENT DOCUMENTS 3,861,722 A * 1/1975 Kenyon .................. F16L 23/02
285/337
4,073,514 A 2/1978 Pate
(Continued)

FOREIGN PATENT DOCUMENTS

EP 0742017 A2 11/1996
EP 1108176 B1 12/2005
(Continued)

OTHER PUBLICATIONS

Translation; FR 2692644; 1992; all.*
(Continued)

*Primary Examiner* — Benjamin F Fiorello
(74) *Attorney, Agent, or Firm* — Taft Stettinius & Hollister LLP

(57) ABSTRACT

A fluid connection joint to couple tubular pipes intended to convey gas, compressed air and other fluids. The fluid connection joint includes a deformable internal ring having sealing surfaces internally to engage with an outer surface of a first tubular element and frontally to engage with a second tubular element. The deformable internal ring is located within a housing that is coupled to a flange of the second tubular element by fixing screws. The tightening of the fixing screws results in a substantially radial compression of the internal ring and seals around the first tubular element and a second substantially axial compression of the frontal seal against the flange.

8 Claims, 5 Drawing Sheets

(51) Int. Cl.
*F16L 23/02* (2006.01)
*F16L 23/16* (2006.01)
*F16L 23/22* (2006.01)
*F16L 23/024* (2006.01)

(52) U.S. Cl.
CPC ............ *F16L 23/162* (2013.01); *F16L 23/22* (2013.01); *F16L 2201/20* (2013.01)

(56) References Cited

U.S. PATENT DOCUMENTS

| | | | |
|---|---|---|---|
| 4,146,254 A | | 3/1979 | Turner et al. |
| 4,288,105 A | | 9/1981 | Press |
| 4,299,413 A | | 11/1981 | Neher |
| 4,407,526 A | | 10/1983 | Cicenas |
| 4,457,541 A | | 7/1984 | Kelly et al. |
| 4,568,109 A | | 2/1986 | Prueter |
| 4,832,379 A | * | 5/1989 | Smith ................ F16L 23/0286 285/323 |
| 5,176,406 A | | 1/1993 | Straghan |
| 5,549,334 A | | 8/1996 | Zeisler et al. |
| 5,603,530 A | | 2/1997 | Guest |
| 5,733,503 A | * | 3/1998 | Kowatsch .............. A61B 1/121 422/28 |
| 5,803,513 A | | 9/1998 | Richardson |
| 5,842,726 A | | 12/1998 | Halen, Jr. |
| 6,945,570 B2 | * | 9/2005 | Jones .................... F16L 21/04 285/104 |
| 7,004,511 B2 | * | 2/2006 | Barron ................... F16L 21/08 285/113 |
| 7,093,863 B2 | * | 8/2006 | Holmes, IV ............ F16L 21/04 285/104 |
| 7,104,573 B2 | * | 9/2006 | Copeland ................ F16L 21/04 285/337 |
| 7,125,054 B2 | * | 10/2006 | Jones ..................... F16L 21/04 285/104 |
| 8,205,915 B1 | | 6/2012 | Crompton et al. |
| 8,480,134 B2 | * | 7/2013 | Crompton .......... F16L 37/0915 285/315 |
| 9,611,958 B1 | * | 4/2017 | Carter, Jr. ............ F16L 19/08 |
| 2009/0273184 A1 | * | 11/2009 | Wright ................ F16L 17/025 285/337 |
| 2011/0210543 A1 | | 9/2011 | German et al. |
| 2015/0377392 A1 | * | 12/2015 | Dell'Acqua .......... F16L 19/046 285/322 |

FOREIGN PATENT DOCUMENTS

| | | |
|---|---|---|
| FR | 1201165 | 12/1959 |
| FR | 1574855 A | 7/1969 |
| FR | 2692644 A1 | 12/1993 |
| GB | 2184186 | 6/1987 |
| GB | 2300680 | 11/1996 |
| WO | 9418486 A1 | 8/1994 |

OTHER PUBLICATIONS

European Search Report, EP15170425, dated Sep. 23, 2015.
European Patent Office Extended Search Report for EP Patent Application No. 16 186 268.5, dated Dec. 20, 2016 (9 pages).

* cited by examiner

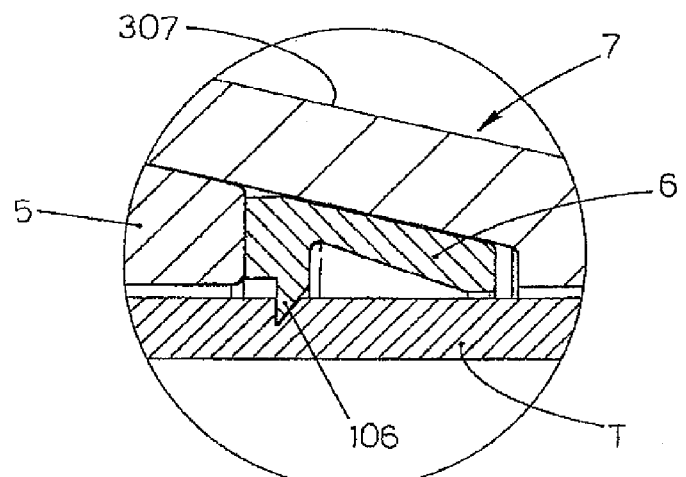
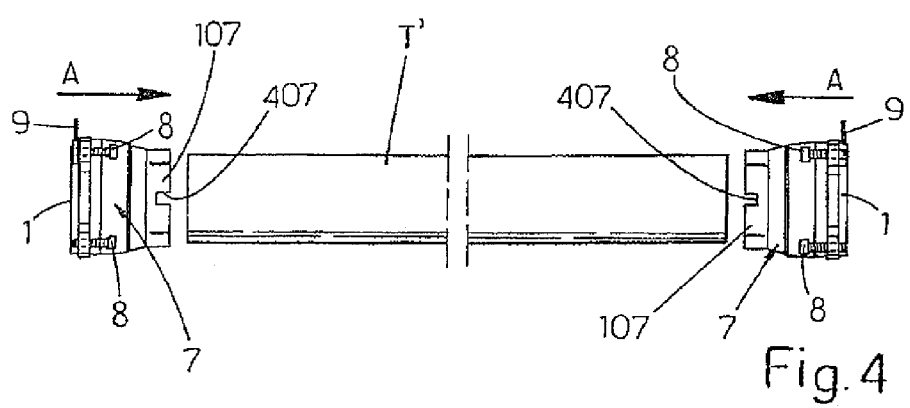

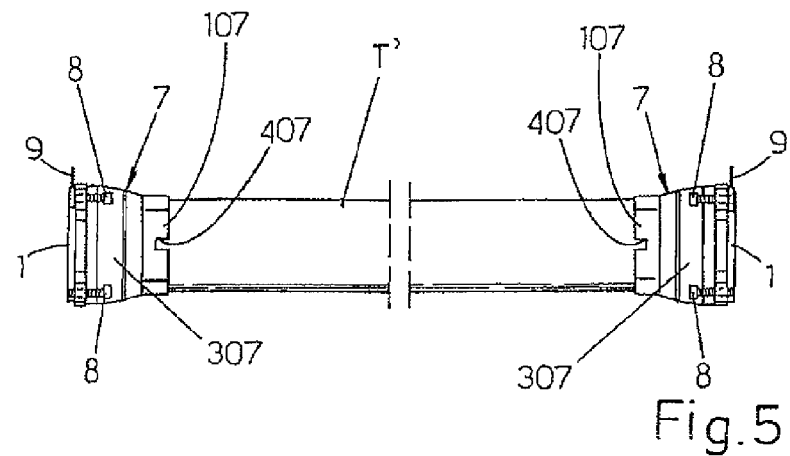
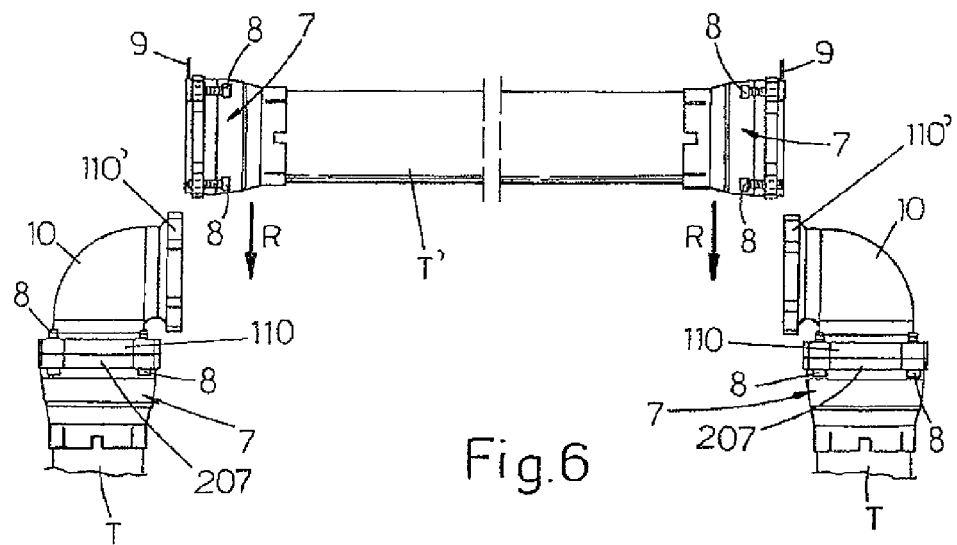

CONNECTION JOINT FOR PIPES TO CONVEY GAS, COMPRESSED AIR AND OTHER FLUIDS

TEXT OF THE DESCRIPTION

This invention concerns a joint to connect pipes, in particular aluminum pipes, intended to convey gas, compressed air and other fluids.

It is well known that when building or carrying out ordinary maintenance of fluid transportation piping, particularly for gas, compressed air or other fluids, it becomes necessary to connect various sections of piping to each other, sometimes also using special joints of various shapes and sizes. Frequently, the work conditions under which said connections are made are not optimum and, in any case, these operations must be carried out as quickly and efficiently as possible, always ensuring optimum sealing conditions.

Document FR12011165A describes a joint for flexible or semi-rigid plastic pipes, and specifically polyethylene pipes, which includes a sleeve equipped with a flange, which is fastened with bolts to the flange of a pipe to be connected. While being inserted into the sleeve, the pipe to be connected faces some interference from the internal seal.

Document GB2300680A describes a joint that includes a tubular end to be inserted into a cavity made in such a way that, when the tubular end is inserted into the cavity, an annular gap is created between the outer surface of the element being inserted and the inner surface of the cavity. The annular gap can accommodate a grab ring.

Document GB2184186 describes improvements concerning fire- and/or corrosion-resistant sleeves, in particular a coupling for pipes essentially first and second seaming means surrounding the pipe and connected by screwing one to the other.

All these known systems describe joints that have limitations from the point of view of assembly and sealing. First of all, in all joints mentioned, the pipe is not inserted freely into the joint; there is always interference from a ring seal and, therefore, the pipe needs to be inserted into the joint by forcing it to some extent. In addition, once the pipe has been connected, the seals intended for the joint remain essentially as they were in the first pipe-positioning phase; therefore, the sealing of the joint, if used in pressurized conduits, is not optimum. Also, normally, in case of fault, maintenance intervention, or replacement, it is necessary to cut the pipe to carry out said operations.

The purpose of this invention is thus to build a connection joint for pipes, in particular aluminum pipes intended to convey gas, compressed air, or other fluids, which can be utilized quickly and efficiently and which guarantees a perfect seal all the time, thus eliminating the limitations of the known joints and systems described above.

This invention fulfills this purpose by using a joint to connect pipes intended to convey compressed air, gas, or other fluids according to claim 1.

Additional advantageous characteristics of this joint are the subject of the dependent claims.

The inner deformable ring according to the invention has the advantage of having, on the inside, sealing elements capable of being compressed against the first tubular element inserted into the joint, and front seals that are compressed against the second tubular element to be connected to the first tubular element through this joint. The insertion phase of the first tubular element is completely free, because, initially, diameter of the ring inside the external housing and those of the inner seals are greater than the outer diameter of the first tubular element. This inner ring can be made of plastic, for example.

In order to prevent the first tubular element from sliding from the joint, a grab ring is used preferentially; this grab ring too has an inside diameter greater than the outside diameter of the first tubular element. This grab ring can have, for example, one or more sufficiently sharp inner edges or teeth.

Therefore, advantageously, the first tubular element does not meet any kind of obstacle or interference when it is inserted into this joint and it comes into contact against a final end stop element provided in the inner ring.

Moreover, when this joint is used, the replacement and/or maintenance interventions on the fluid transportation conduit sections can be carried out directly in the field, thanks to piping sections inserted radially and already equipped with the joints according to the invention installed at the end of said sections.

Further characteristics and advantages of this invention will become clearer in the course of this description, which is to be considered as an example and not limitative and which refers to the attached drawings, in which:

FIG. 3 shows a side elevation cross-sectional view, in a larger scale, of the detail K of FIG. 2, which refers to an annular grab element;

FIG. 4 shows the first phase of an example of connection of two joints according to the invention at the two ends of a pipe;

FIG. 5 shows the pipe of FIG. 4, with the joints inserted at the ends of the pipe;

FIG. 6 shows the pipe of the two preceding figures, fitted with the two joints, ready to be inserted radially between two other joints fitted with an elbow joint;

Figure 1:
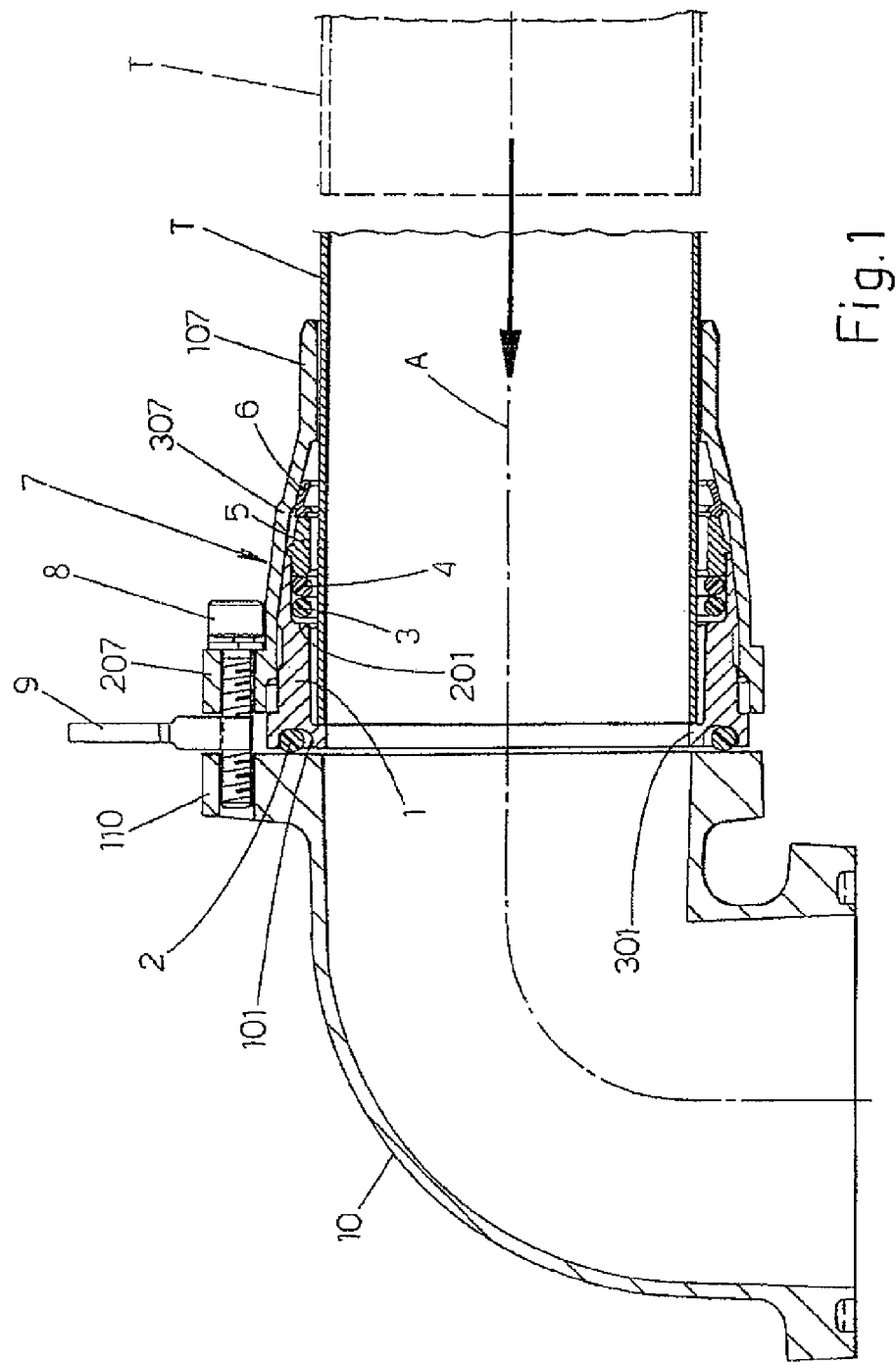
FIG. 1 shows a side elevation cross-sectional view of a pipe inserted into a connection joint according to this invention and equipped with a coupling element.

With reference to said attached drawings, and with specific reference to FIG. 1 in the drawings, T indicates a pipe, specifically an aluminum pipe used to convey gas, compressed air, or other fluids, that can be inserted into a joint according to this invention. Said joint includes an inner deformable ring 1, made, for example of plastic and suitably shaped. This ring includes a first front annular seat 101 which houses a first sealing element 2 and a second inner annular seat 201 which houses two more sealing elements 3 and 4, positioned around the outer surface of pipe T. Said ring, bearing the seals 2, 3, and 4 includes, at its front end, an annular step 301, which acts as end stop for the end of pipe T and thus ensures its correct positioning inside the joint. Said seals 2, 3, and 4 can be ordinary O-rings or they can be hydraulic seals. As it can be seen, the inner cross-section of ring 1 has a truncated cone shape; specifically, said cross section narrows going from the rear area where the two seals 3 and 4 are located to the front area where the annular step 301 stopping the end of pipe T is located. This truncated cone cross section of ring 1 facilitates the insertion of pipe T and, as we shall see, it undergoes suitable deformation in order to allow a certain compression of seals 3 and 4 on said pipe T. At the rear of ring 1, this joint includes a thrust ring 5, in contact with an annular grab element 6 having, for example, one or more suitably shaped inner edges 106 (see FIG. 3) made of steel, so that they can partially penetrate, to a suitable depth, into the aluminum pipe T. Naturally, said annular grab element 6 could have a different shape; for example, it could have more than one sharp edges or teeth to grab pipe T. In essence, the function of said ring 6 is to prevent pipe T from sliding after it has been inserted into ring 1 and the joint has been tightened. An external housing 7, preferably made of metal houses inside itself said annular grab element 6 and said thrust ring 5. Ring 1 is also almost completely inserted in said external housing 7 and protrudes from said external housing for a short stretch, in which seat 101, housing seal 2, is located. Said external housing 7 includes, at the rear, a cylindrical sleeve 107 to insert pipe T and an intermediate part 307 having a truncated cone shape, with an internal conical slope opposite to the internal conical slope of ring 1. In practice, the conical slope of ring 1 is directed towards the outside of the joint; that is to say, said ring widens towards the side where pipe T is inserted, so as to offer a kind of entrance seat for the pipe. On the contrary, the external housing widens towards the inside of the joint, essentially to suitably accommodate rings 1, 5, and 6. Moreover, all these rings 1, 5, and 6 have a truncated cone outer surface and rest against the truncated cone inner wall of the external housing 7. Moreover, the inside diameters of the rings 1, 5, and 6 and of seals 3 and 4 are larger than the outside diameter of pipe T; this causes insertion of the pipe T to be free and extremely quick and efficient. Said housing 7 includes, at the front, a flange 207 in which a series of number 8 bolts are inserted, directed essentially along the joint's A axis. Said external housing 7 (see, FIG. 4 for example, also includes a window 407 to mark pipe T, useful, for example, to correctly position pipe T. The number 8 bolts can be arranged in a ring pattern around flange 207; their number can vary depending on the requirements and, preferably, they shall be at equal distance from each other. A safety spacer ring 9 is also positioned at one side of said external housing 7; when the joint is transported or handled, the spacer, which is removed before assembly, prevents tightening of the inner group, that is, essentially, ring 1 and annular grab element 6, to pipe T. Flange 207 faces flange 110 of a joint 10, which is elbow-shaped in the figure, but could also be straight, "L-shaped," or "T-shaped." In this case, the number 8 tightening bolts of the joint are deployed between flange 207 of housing 7 and flange 110 of connecting element 10, as clearly shown in FIG. 1. The safety spacer ring 9 is positioned between the two flanges 207 and 110; it is capable of engaging the protruding threaded part of one of the number 8 tightening bolts. Said spacer rings 9 (if more than one) are removed before assembly.

In practice, this joint, in its supply and transportation configuration can be as shown in FIG. 1, without pipe T, that is, with housing 7 partially bolted to a connecting element 10 by partial screwing of the number 8 bolts on flanges 207 and 110 and, naturally, with one or more spacer elements 9 in position. All rings 1, 5, and 6 found inside the external housing 7 and seals 2, 3, and 4 are not subject to any compression in this transport configuration.

Figure 2:
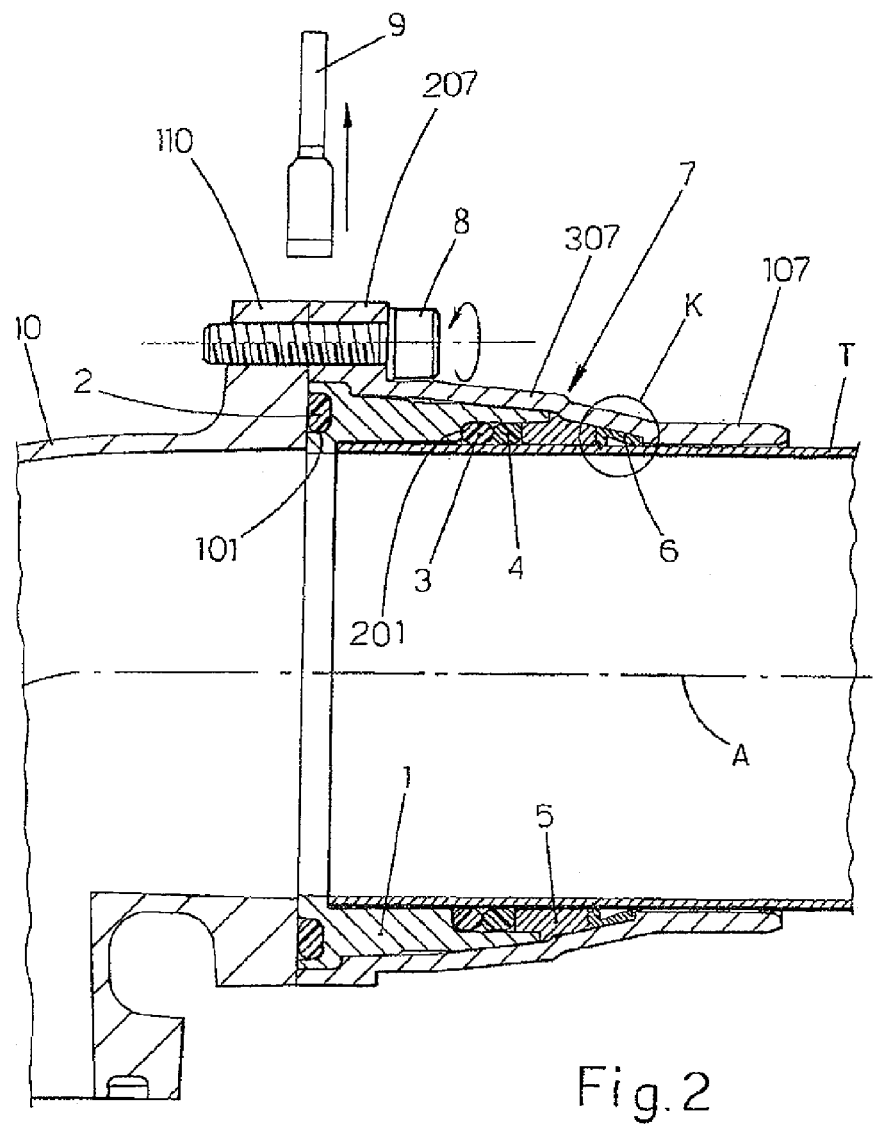
FIG. 2 shows a side elevation cross-sectional view of the joint of FIG. 1, from which a safety ring tightened around the pipe has been removed.
Figure 7:
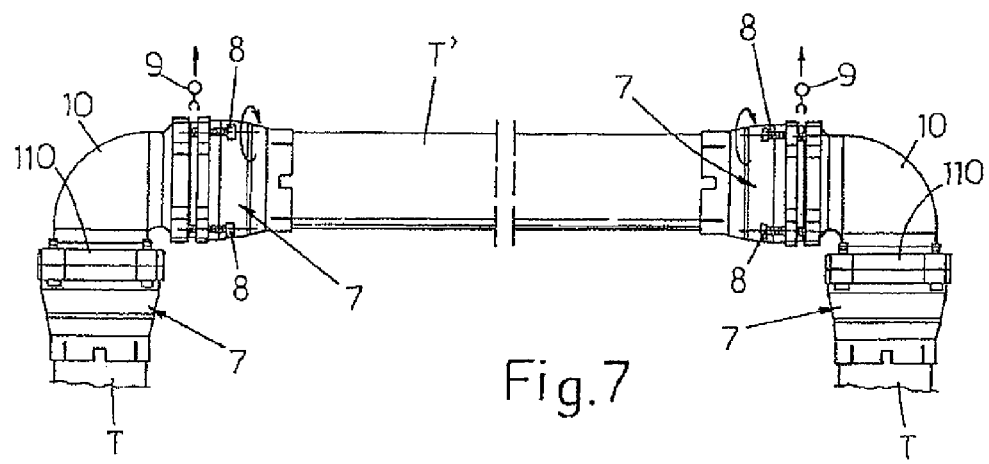
FIG. 7 shows the operation of extracting the safety rings from the two joints of the pipe of the preceding figures.

As already mentioned, in order to complete the connection of pipe T with joint 10 (see FIG. 2), pipe T is inserted into inner ring 1 of this joint, until it is stopped against annular step 301; the safety ring 9 is then removed. Said pipe T is inserted very easily along the A axial direction inside ring 1 of this joint, because, as can be seen from the figures and as discussed previously, it does not meet any obstacles or interferences and its positioning is quick and accurate. After safety ring 9 has been removed, the number 8 bolts in flange 110 of joint 10 are tightened as indicated by the arrows' symbols. Flange 207 of external housing 7 and flange 110 of joint 10 will come into contact with each other. Essentially, said tightening determines the radial pressure of the metal external housing 7 on the plastic inner ring 1, which deforms elastically and tightens radially around pipe T. Obviously, said radial direction is essentially perpendicular to the A axis direction defined with reference to FIG. 1, for example. As it can be seen from FIG. 2, the inside cross-section of ring 1 is now practically cylindrical and the two seals 3 and 4 are suitably compressed between pipe T and the inner surface of ring 1. As a result of tightening the number 8 bolts, the front seal 2 is also compressed against flange 110 of joint 10. The suitable compression of seals 2, 3, and 4 guarantees the optimum sealing of this joint. Finally, as a result of tightening the number 8 bolts, the teeth or the inside edge 106 of annular grabbing element 6 penetrate the outer surface of aluminum pipe T to a suitable depth. The thrust ring 5 contributes to make the tightening of grabbing ring 6 more effective. Therefore, also thanks to said annular grabbing element 6, this joint is perfectly positioned and fastened to pipe T.

The operation of fastening a joint 10 to pipe T through this joint, as described above, is completed if the work space is sufficient, that is, essentially, if there is enough space available to insert pipe T into the joint. Obviously, as mentioned above, joint 10 could be of any type, therefore even another section as pipe T or a "T-shaped" element.

Figure 8:
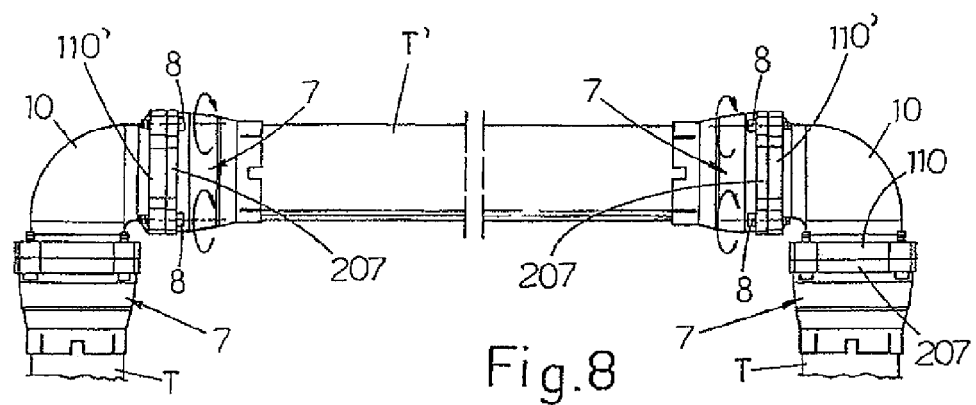
FIG. 8 shows the final tightening phase of the joints' bolts, so as to firmly fasten the two elbow joints to the central pipe, using two joints according to this invention.

If the work space is insufficient, for example if a pipe section needs to be replaced, as shown in FIGS. 4 to 8, the following can be done: the pipe section T' is readied, already fitted with a joint according to this invention at each end (see, in particular, FIGS. 4 and 5) into which the two sleeves 107 of the two external housings 7 are inserted freely into the ends of pipe T'. The pipe T', fitted with the two joints, is inserted along the radial direction R (see FIGS. 6 and 7) between the two joints 10. By way of example, the figures show the two joints fitted, on the side opposite to that connecting to pipe T', with additional sections of pipe T connected to the flanges 110 through additional joints according to the invention. Once pipe T' is in position, the safety spacer rings 9 are removed and the number 8 bolts can be tightened to bring the flanges 110' of joints 10 close to the flanges 207 of the external housing 7, as shown in FIG. 3, until the final situation of FIG. 8 is reached. Tightening of the bolts will cause the deformation under compression of the various seals and the penetration of the grab ring on the outer surface of pipe T'.

As it can be supposed, if one wants to remove the pipe section T' or even one of the joints 10, it is sufficient to unscrew the related number 8 bolts, so as to extract pipe T' radially, in the direction opposite to that shown and then, if necessary, remove it from the two external housings 7 of the two joints according to the invention.

The procedure described above to replace a pipe section has the advantage of avoiding making cuts on the conduits; in fact, by utilizing this joint at each end or the piping to be used, whether it is a straight section, an elbow joint, a "T" junction, or other, it is always possible to dismantle the various sections of the conduit piece by piece. Said dismantling is done simply by acting on the number 8 bolts.

Therefore, compared to the known joints, this joint has an internal deformable ring, which can be made of plastic or metal, which contains all seals, and which is tightened against the flange of the connecting element by screwing the bolts of the external housing. As already seen, advantageously, the inside ring, internal seals, thrust ring, and grabbing ring have, in their rest position, diameters greater than the outside diameter of the pipe to be inserted; all interferences are thus avoided. Moreover, the outer parts of the rings housed in the external housing adhere perfectly, even at rest, to the inner wall of said external housing. Once tightened, this joint forms, in essence, a single body with the pipe; this has the advantage of avoiding any variations, especially of ring 1, which contains the seals, even under strong pressure thrusts.

In addition, the known systems do not allow the assembly and disassembly in the radial direction R of pipe sections connected to the joints, as shown in FIGS. 4 to 8. By contrast, this joint makes it possible to carry out said assembly and disassembly, which can be used in conduits carrying fluids under high pressure. There is no doubt that, by using this joint, installing piping becomes simpler and quicker compared to when using known systems; moreover, even any operations to modify existing installations (for example due to expansions, introduction of new branch lines, maintenance, etc.) become quicker, more efficient, and less costly.

The invention claimed is:

1. A connection joint for a first tubular element and a second tubular element provided with a flange, the tubular elements being suitable for the transport of fluids, wherein the connection joint comprises:
   a deformable internal ring provided internally and frontally with seal seats;
   a plurality of seals seated in the seats of the internal ring, wherein at least one internal seal of the plurality of seals is configured to be placed around and compressed against the first tubular element when the first tubular element is inserted into the connection joint, and wherein a frontal annular seal of the plurality of seals is compressed against the second tubular element, when the second tubular element is connected to said first tubular element through the joint;
   an external housing in which said deformable internal ring is housed and which is provided with a flange having fixing screws configured to engage in said flange of the second tubular element;
   a seaming ring configured to prevent the extraction of the first tubular element, when inserted into the connection joint;
   wherein the inner diameters of said internal ring and of said at least one internal seal is greater than the outer diameter of said first tubular element so that said first tubular element is freely insertable inside said external housing, said internal ring and said at least one internal seal and wherein said fixing screws of the external housing are configured to be tightened on said flange of said second tubular element, resulting in a pressure of the external housing on the internal ring, so as to determine a substantially radial compression of the internal ring and of the at least one internal seal around the first tubular element and a substantially axial compression of the frontal seal against said flange of the second tubular element; and
   a pushing ring positioned between the seaming ring and the internal ring and engaged within the internal seal seat.

2. The joint according to claim 1, wherein said seaming ring comprises at least an internal annular element configured to clutch to said first tubular element, the inner diameter of said internal annular element being initially greater than the outer diameter of said first tubular element and said internal annular element being configured to penetrate into a lateral wall of said first tubular element because of the tightening of the external terminal housing.

3. The joint according to claim 1, wherein said internal ring comprises a final annular step to stop said first tubular element.

4. The joint according to claim 1, wherein the outer walls of said internal ring and of said seaming ring are directly in contact with the internal wall of the external housing.

5. The joint according to claim 1, wherein said internal ring has a frustoconical inner section that tends to enlarge towards the side of insertion of said first tubular element.

6. The joint according to claim 1, wherein said external housing comprises a first cylindrical sleeve for the insertion of the first tubular element and a central part having a frustoconical section which tends to enlarge towards the side of housing of said internal ring.

7. The joint according to claim 1, further comprising one or more security rings positioned on at least a screw that engages between the flange of the second tubular element and the flange of the external housing.

8. The joint according to claim 1, wherein said deformable ring, said pushing ring and said seaming ring have a frustoconical outer surface leaning against the frustoconical inner wall, of the external housing.

* * * * *